United States Patent [19]

Kishimoto

[11] Patent Number: 4,624,894

[45] Date of Patent: Nov. 25, 1986

[54] MAGNETIC RECORDING MEDIUM

[75] Inventor: Mikio Kishimoto, Osaka, Japan

[73] Assignee: Hitachi Maxell, Ltd., Osaka, Japan

[21] Appl. No.: 719,868

[22] Filed: Apr. 4, 1985

[30] Foreign Application Priority Data

Apr. 6, 1984 [JP] Japan ................................. 59-69861

[51] Int. Cl.⁴ ............................................. G11B 5/70
[52] U.S. Cl. .................................... 428/328; 360/134;
360/135; 360/136; 427/128; 427/131; 428/329;
428/522; 428/694; 428/425.9; 428/900
[58] Field of Search ............... 428/694, 900, 695, 329,
428/328, 425.9, 522; 427/128, 131;
360/134–136; 252/62.54

[56] References Cited

U.S. PATENT DOCUMENTS

| | | | |
|---|---|---|---|
| 4,135,016 | 1/1979 | Ogawa | 428/900 |
| 4,442,159 | 4/1984 | Dezawa | 427/128 |
| 4,511,617 | 4/1985 | Hideyama | 428/694 |

*Primary Examiner*—Ellis P. Robinson
*Attorney, Agent, or Firm*—Birch, Stewart, Kolasch & Birch

[57] ABSTRACT

In a magnetic recording medium, double magnetic layers are formed on one side of a substrate with a lower magnetic layer containing metallic magnetic particles formed on the substrate and an upper magnetic layer containing plate-shaped ferrite magnetic particles of the hexagonal structure with the magnetization axis oriented in a direction vertical to the surface of the upper magnetic layer formed on the lower magnetic layer for enabling high output level recording over a wide wave length range.

18 Claims, No Drawings

MAGNETIC RECORDING MEDIUM

FIELD OF THE INVENTION

The present invention relates to a magnetic recording medium, and more particularly to a recording medium for effecting a high density recording of signals ranging from a short wave length to a long wave length with a high output level.

BACKGROUND OF THE INVENTION

In order to record short wave signals with a high output level in a magnetic recording medium such as magnetic recording tape, there has been proposed a method of using a vertical magnetizing component of the magnetic recording medium. One example of this method is to orient acicular particles in a vertical direction relative to the surface of the magnetic layer of the recording medium. However, in the process of coating the magnetic layer on a substrate and drying thereof, the magnetic particles oriented vertically tend to be laid in the horizontal direction due to compression of the magnetic layer in a thickness direction of the magnetic layer. Therefore, it is difficult to keep the magnetic particles oriented vertically after drying. In addition, according to this method, the smoothness of the surface of the magnetic layer is deteriorated.

Another method is to coat hexagonal structure barium ferrite particles having the axis of easy magnetization vertical with respect to the particle plate in such a manner that the axis of easy magnetization is oriented vertically against the surface of the magnetic layer by orienting the plate surface of hexagonal structure barium ferrite particles in parallel with the surface of the magnetic layer. This method is effective to obtain a high output level of recording in the short wave range of the signal having the wave length shorter than 1 micronmeter. However, according to the study by the present inventor, it has been found that even in the recording medium made by this method, a high output level recording can not be obtained in the long wave length range.

SUMMARY OF THE INVENTION

An object of the present invention is to provide a magnetic recording medium which is able to record signals of long wave length as well as short wave length with a high output level.

In order to study the cause of low output level in the long wave length recording, the present inventor prepared various kinds of recording medium made by the latter method using plate-shaped hexagonal structure barium ferrite and examined their recording characteristics. As a result of study, in order to obtain a high output level in the low wave length recording it has been found that the parallel magnetization component is more effective for the low wave length range than the vertical magnetization component. Accordingly, it has been also found that the parallel magnetization component must be provided in the recording medium in addition to the vertical magnetization component in the recording medium for either the short wave length recording or the long wave length recording with a high output level. Since the surface region of the magnetic layer mainly contribute a high output level recording in the short wave length range, it is also found that it is effective to make the vertical magnetization component larger in the surface region of the magnetic layer than that inside of the layer for the short wave length recording.

According to the knowledge obtained by the inventor as described above, the magnetic recording medium according to the present invention is provided with two magnetic layers. One of the magnetic layers is near the recording surface thereof (referred to as an upper magnetic layer hereinafter) and is formed using plate-shaped hexagonal structure ferrite particles having a particle diameter of a predetermined range with the axis of the easy magnetization (referred to as magnetization axis hereinafter) oriented vertically to the surface of the magnetic layer. A another magnetic layer further from the recording surface (referred to as a lower magnetic surface hereinafter) is formed using metallic magnetic material. Furthermore, the coercive force of the upper magnetic layer is larger than the coercive force of the lower magnetic layer, whereby a high output level recording can be made over the range from a short wave length to a long wave length.

DESCRIPTION OF THE INVENTION

Therefore, the magnetic recording medium according to the present invention comprises an upper magnetic layer containing plate-shaped ferrite magnetic particles of hexagonal structure having an average particle diameter of 0.03 micronmeters to 0.2 micronmeters with the axis of easy magnetization of the magnetic particles oriented substantially vertically to the surface of the magnetic layer and a lower magnetic layer containing metallic magnetic particles and a ratio $H_{cu}/H_{cl}$ of the coercive force $H_{cu}$ in the upper layer and the coercive force $H_{cl}$ in the lower layer in the vertical direction relative to the surface of the magnetic layer is in a range 1.1 to 1.5.

The average particle diameter of each of the plate-shaped ferrite particles of the hexagonal structure contained in the upper layer having the axis of easy magnetization oriented in vertical direction against the surface of the plate must be 0.03 to 0.2 micronmeters and preferably 0.05 to 0.15 micronmeters.

With the particle diameter larger than 0.2 micronmeters, the smoothness of the magnetic layer is deteriorated. With the particle diameter smaller than 0.03 micronmeters, the degree of orientation of the magnetization axis is decreased. The required coercive force may be changed depending on the use of the recording medium, preferably a coercive force of 400 to 2,000 (Oe) may be chosen.

As the plate-shaped ferrite particles of the hexagonal structure, various kinds of barium ferrite particles may be used. A method of the production of one representative thereof is as follows, A mixed solution of 1/6 to 1/12 mol barium chloride and 1/8 to 1/50 mol cobalt chloride is solved into 1 mol ferric chloride. The solution is then solved with 4 to 10 mol alkali hydroxide and are mixed and the obtained suspension is put in atmosphere for a predetermined time, thereafter heated and reacted in an autoclave to produce particles. The particles thus produced are washed and dried. Then, the particles are processed by heating in air thereby obtaining plate-shaped barium ferrite particles having a hexagonal structure. In the process mentioned above, by changing the mol ratio of the cobalt chloride, the magnetic characteristics such as coercive force, saturation magnetization and squareness ratio of the magnetic particles can be controlled.

As the magnetic particles for the lower magnetic layer, various kinds of metallic magnetic particles such as Fe, Co, Ni, Fe-Co alloy, Fe-Co-P alloy may be used. The average particle diameter of each grain (long axis) is selected in a range of 0.05 to 0.5 micronmeters, preferably 0.1 to 0.3 micronmeters with the acicular ratio (long diameter/short diameter) to be 3 to 15.

The coercive force of the metallic magnetic particles may be preferably equal to or slightly smaller than the coercive force of the plate-shaped barium ferrite particles of the hexagonal structure in order to obtain the ratio of the coercive force $Hc_{cu}/H_{cl}$ in the vertical direction with 1.1 to 1.5. Preferably the ratio of coercive force of the ferrite particles/metallic magnetic particles may be selected in a range of 1.1 to 1.5.

The respective magnetic layers may be formed in a similar manner as the conventional method of making the conventional magnetic recording medium. Two kinds of magnetic coating material are prepared for the upper magnetic layer and the lower magnetic layer both layers containing binder and the magnetic particles. Then the magnetic coating material for the lower magnetic layer is first coated on a substrate and dried. Thereafter, the magnetic coating material for the upper magnetic layer is coated above the lower magnetic layer. Subsequently, a magnetic field is applied in the vertical direction relative to the surface of the recording medium, whereby the magnetization axis or the component of the plate-shaped ferrite particles of the hexagonal structure is oriented vertical relative to the surface of the magnetic recording medium.

The lower magnetic layer may be subjected to an orientation process for orienting the magnetization component in the surface direction as performed in making the conventional magnetic recording medium. The total thickness of the upper and lower magnetic layers may be 1 to 6 micronmeters with the ratio of thickness of the upper layer and the lower layer i.e., thickness of the upper layer/thickness of the lower layer may be 0.1 to 1 and preferably 0.2 to 0.8.

As the binder agent for the upper and lower magnetic layers, various agents known for the binder in making the conventional magnetic recording medium may be used. For example, co-polymer of vinyl chloride-vinyl acetate, polyester, polyurethane, cellulose resin, polyvinyl butyral, polyacetal and polyisocianate may be used.

In the magnetic recording medium according to the present invention, the two magnetic layers should be provided with the ratio (vertical coercive force of the upper layer/vertical coercive force of the lower layer) of 1.1 to 1.5 preferably 1.2 to 1.4. By the definition described above, there can be obtained a large amount of the vertical magnetization component, which is effective for increasing the output level of the short wave range recording and in the region near the surface of the recording medium which is also effective for increasing the output level of the short wave range recording. On the other hand, the lower magnetic layer can contribute to increasing the output level of the longer wave range recording, so that a high output recording can be realized over a wide range of wave length from a short wave to a long wave.

With the ratio of the coercive force smaller than 1.1, the effects mentioned above may be decreased. In order to increase the ratio of the coercive force larger than 1.5, there must be employed metallic particles having a small coercive force, thereby resulting in deterioration of the magnetic characteristic of the lower magnetic layer.

The ratio of the coercive force of the upper layer and the lower layer depends mainly upon the coercive force of the magnetic particles used in the magnetic layers and further depends upon the amount of contained magnetic particles and the degree of the orientation of the magnetic particles in the parallel direction of the surface of the magnetic layer. In other words, it depends on the intensity of the magnetic field applied to the magnetic layers for orientation.

DESCRIPTION OF THE EXAMPLES

Before the description proceeds it is noted that the magnetic particles Ba-1, Ba-2, Ba-3 and Fe-1 used in the examples are made in the manner described below.

Magnetic particles BA-1

1 mol of ferric chloride, 1/8 mol of barium chloride and 1/40 mol of cobalt chloride were solved in 1 liter of water. This solution was added into 1 liter of sodium hydroxide solution containing 5 mol sodium hydroxide and agitated to prepare a suspension. The suspension was left alone for a day and thereafter, the suspension was heated for reaction at 300° C. in an autoclave for 2 hours. The obtained particles were washed, dehydrated and dried. Thereafter, the particles were heated at 800° C. in air for 2 hours to obtain plate-shaped barium ferrite particles of the hexagonal structure with the particle diameter 0.15 micronmeters, coercive force 1,320 Oe(oersteds), saturation magnetization 58.6 emu/g and squareness ratio 0.49.

Magnetic particles Ba-2

Magnetic particles were prepared in a similar manner as employed in making the magnetic particles Ba-1 except for using cobalt chloride of 1/35 mol. Then, plate-shaped barium ferrite particles of the hexagonal structure were prepared with an average particle diameter 0.12 micronmeters, coercive force 1,220 Oe, saturation magnetization 58.4 emu/g and squareness ratio 0.49.

Magnetic particles Ba-3

Magnetic particles were prepared in a similar manner as employed in making the magnetic particles Ba-1 except for the amount of cobalt chloride 1/20 mol. Then plate-shaped barium ferrite particles of the hexagonal structure were prepared with an average particle diameter 0.12 micronmeters, coercive force 920 Oe, saturation magnetization 58.2 emu/g and squareness ratio 0.47.

Magnetic particles Fe-1

In 20 liter of aqueous solution of sodium hydroxide of density 5 mol/liter, 20 liter aqueous solution of ferrous sulfate ($FeSO_4.7H_2O$) of density 0.719 mol/liter was added and agitated for reaction at room temperature, whereby a deposit of milk white colored with green of ferrous hydroxide was obtained. The PH of the suspension was more than 12. Air was blown into the suspension at a rate of 30 liter/min kept at 40° C. and agitated for 8 hours to obtain a suspension of $\alpha$-FeOOH grains. The particle diameter (long diameter) of the $\alpha$-FeOOH grains in the suspension was 0.2 micronmeters with the acicular ratio of 8. The PH of the suspension after reaction was 13.6.

In the alkaline suspension containing the α-FeOOH grain, 1 liter having aqueous solution of sodium orthosilicate of a density 1 mol/liter was added. Carbonic acid gas was blown into the solution to neutralize it to below a Ph of 10, so that α-FeOOH particles coated by hydrated silicic acid was obtained. The particles were dried at 100° C. and thereafter the particles were heated at 800° C. for 2 hours to obtain α —$Fe_2O_3$ particles. The particles were subjected to reduction in an electric furnace in a hydrogen gas flow of 10m$^3$/ hour at 500° C. for 6 hours. After the reduction, the particles were soaked in toluene solution, whereby metallic iron particles of 0.86 kg were obtained. The average particle diameter (long diameter) was 0.1 micronmeters with acicular ratio 6, coercive force 1,180 Oe, saturation magnetization 158 emu/g and squareness ratio 0.50.

EXAMPLE 1

Magnetic particles Ba-1: 750 by weight
Co-polymer of vinylchloride, vinylacetate and vinyl alcohor: 125 by weight
Polyurethane: 100 by weight
Polyisocianate: 25 by weight
Stearic acid-n-butyl: 15 by weight
Methylisobutylketon: 600 by weight
Toluene: 600 by weight The above composition was mixed and dispersed in a ball mill for three days so as to prepare the magnetic coating material for the upper magnetic layer. A similar magnetic coating material as mentioned above except for using the magnetic particles Fe-1 in place of Ba-1 was prepared for the lower magnetic layer.

The coating material for the lower layer as mentioned above was coated to a 3 micronmeter thickness on a polyester base film having a 12 micronmeter thickness. Before the coated layer was dried, the base film with the lower magnetic layer coated thereon was subjected to a magnetic field for orientation in the parallel direction relative to the layer surface and then dried. Subsequently, the coating material for the upper magnetic layer was coated above the lower magnetic layer to a 1 micronmeter thickness when dried. That is to say the total thickness of the magnetic layer was 4 micronmeters. Then, before drying the base film coated with the lower and upper magnetic layers was subjected to a magnetic field of 4,000 Oe in the vertical direction relative to the layer surface using an N-S magnet and then dried. The surface was smoothed and further cut to a predetermined width to prepare a magnetic recording tape.

EXAMPLE 2

A magnetic recording tape was prepared in the same manner as used in the EXAMPLE 1 except for using the magnetic particles of Ba-2 750 by weight for the upper magnetic layer in place of Ba-1.

COMPARATIVE EXAMPLE 1

A polyester base film was coated with only a magnetic coating material for the upper magnetic layer in the EXAMPLE 1 with a thickness of 4 micronmeters when dried and processed by the magnetic field orientation in the vertical direction and the surface smoothening in a similar manner as used in the EXAMPLE 1 to provide a magnetic recording tape.

COMPARATIVE EXAMPLE 2

A polyester base film was coated with only a magnetic coating material for the upper magnetic layer in the EXAMPLE 2 with a thickness of 4 micronmeters when dried and processed by the magnetic field orientation in the vertical direction and the surface smoothing in a similar manner as used in the EXAMPLE 2 to provide a magnetic recording tape.

COMPARATIVE EXAMPLE 3

A polyester base film was coated with only a magnetic coating material for the lower magnetic layer in the EXAMPLE 1 with a thickness of 4 micronmeters when dried and processed by the magnetic field orientation in the direction parallel to the surface of the magnetic layer and the surface smoothing to provide a magnetic recording tape.

COMPARATIVE EXAMPLE 4

A magnetic recording tape was prepared in the same manner as used in the EXAMPLE 1 except for using the magnetic particles of Ba-3 750 by weight for the upper magnetic layer in place of Ba-1.

COMPARATIVE EXAMPLE 5

A polyester base film was coated with only magnetic coating material for the upper magnetic layer in the COMPARATIVE EXAMPLE 4 with a thickness of 4 micronmeters when dried and processed by the magnetic field orientation in the vertical direction and the surface smoothing in a similar manner as used in the COMPARATIVE EXAMPLE 4 to provide a magnetic recording tape.

The magnetic recording tapes of the above examples 1 and 2 and the comparative examples 1 to 5 were measured with respect to the coercive force in both vertical and parallel directions relative to the surface of the magnetic layers, remanent magnetization, squareness ratio and the saturation magnetization in the vertical direction. Also, the maximum output level (M.O.L.) was measured in terms of various recording wave lengths. The results of these measurements are shown in the TABLE.

It is noted that each of the squareness ratios were obtained by modifying the hysteresis curve assuming the coefficient of reverse magnetic field as 4π. The M.O.L.s are relative values, that is to say the difference from the M.O.L. of the recording tape of the COMPARATIVE EXAMPLE 3 as zero dB in terms of the respective wave lengths.

As is apparent from the results of the measurements, the magnetic recording tapes of the COMPARATIVE EXAMPLES 1, 2 and 5 with the mono magnetic layer containing plate-shaped ferrite particles of the hexagonal structure as the magnetic particles have a high output level in the short wave length region compared with the magnetic recording tape of the COMPARATIVE EXAMPLE 3 with the mono magnetic layer containing metallic magnetic particles as the magnetic particles. However the output levels of the former comparative examples is very low in the long wave length region. The magnetic recording tape of the COMPARATIVE EXAMPLE 4 of the type having double magnetic layers of the upper layer containing plate-shaped ferrite particles of the hexagonal structure as the magnetic particles and the lower layer of the metallic magnetic particles with the vertical coercive force of the upper layer smaller than that of the lower layer shows a disadvantage that the output level in the short wave length range is insufficiently low. To the contrary, the magnetic recording tapes of the EXAMPLES 1 and 2 according to the present invention show high output level in both of the short wave length and the long wave length regions.

It is noted that in the table, the abbreviations in the table SAT., SQRATIO, EX. 1, EX. 2 and CMP. 1 to 5 are respectively saturation magnetization, squareness ratio, EXAMPLES 1 and 2 and COMPARATIVE EXAMPLES 1 to 5.

|  | VERTICAL DIRECTION | | | | PARALLEL DIRECTION | | | M.O.L (dB) | | |
| --- | --- | --- | --- | --- | --- | --- | --- | --- | --- | --- |
|  | COERCIVE FORCE (Oe) | SAT. (G) | RESIDUAL MAGNETI- ZATION (G) | SQ RATIO | COERCIVE FORCE (Oe) | RESIDUAL MAGNETI- ZATION (G) | SQ RATIO | 0.5 μm | 1 μm | 4 μm |
| EX. 1 | 850 | 1,980 | 1,110 | 0.56 | 1,010 | 1,390 | 0.70 | +2.2 | +0.6 | −0.4 |
| EX. 2 | 830 | 1,960 | 1,080 | 0.55 | 1,080 | 1,370 | 0.70 | +2.0 | +0.5 | −0.3 |
| CMP. 1 | 1,350 | 1,520 | 1,220 | 0.80 | 480 | 360 | 0.24 | +2.0 | −0.2 | −4.0 |
| CMP. 2 | 1,260 | 1,510 | 1,210 | 0.80 | 420 | 380 | 0.25 | +1.8 | −0.3 | −3.6 |
| CMP. 3 | 760 | 2,050 | 840 | 0.41 | 1,160 | 1,640 | 0.80 | 0 | 0 | 0 |
| CMP. 4 | 780 | 1,950 | 1,050 | 0.54 | 1,020 | 1,380 | 0.71 | +0.2 | 0 | −0.2 |
| CMP. 5 | 930 | 1,580 | 1,260 | 0.80 | 380 | 410 | 0.26 | +1.4 | 0 | −2.8 |

What is claimed is:

1. A magnetic recording medium, comprising:
a substrate;
a first magnetic layer formed on at least one side of the substrate, said first layer containing metallic magnetic particles;
a second magnetic layer formed on at least one side of said substrate on said first layer, said second layer containing plate-shaped ferrite magnetic particles having a hexagonal structure with the magnetization axis oriented in a direction substantially vertical to the surface of said second layer;
said plate-shaped ferrite magnetic particles having an average particle diameter of 0.03 to 0.2 micrometers; and
the vertical coercive force ratio of the second layer to that of the first layer is 1.1 to 1.5.

2. The magnetic recording medium according to claim 1, wherein the coercive force of the second magnetic layer is larger than the coercive force of the first magnetic layer.

3. The magnetic recording medium according to claim 1, wherein said plate-shaped ferrite magnetic particles of the hexagonal structure are barium ferrite particles.

4. The magnetic recording medium according to claim 1, wherein the coercive force of said plate-shaped ferrite magnetic particles of the hexagonal structure is 400 oersteds to 2000 oersteds.

5. The magnetic recording medium according to claim 1, wherein the metallic magnetic particles in the first layer contains mainly iron particles.

6. The magnetic recording medium according to claim 1, wherein said metallic magnetic particles has an acicular ratio of 3 to 15.

7. The magnetic recording medium according to claim 1, wherein the magnetization axis of said metallic magnetic particles in the first layer is oriented in a direction parallel to the surface of the magnetic layer.

8. The magnetic recording medium according to claim 1, wherein a total thickness of the first and second magnetic layers is 1 to 6 micrometers.

9. The magnetic recording medium according to claim 1, wherein a ratio of the thickness of the second layer to that of the first layer is 0.1 to 1.

10. The magnetic recording medium according to claim 9, wherein the thickness ratio is 0.2 to 0.8.

11. The magnetic recording medium according to claim 1, wherein the coercive force of the metallic magnetic particles is equal to or slightly smaller than that of the plate-shaped ferrite magnetic particles of the hexagonal structure.

12. The magnetic recording medium according to claim 11, wherein the ratio of the coercive force of the plate-shaped ferrite magnetic particles of the hexagonal structure to that of the metallic magnetic particles is 1.1 to 1.5.

13. The magnetic recording medium according to claim 1, wherein the average particle diameter is 0.05 to 0.15 micrometers.

14. The magnetic recording medium according to claim 1, wherein the metallic magnetic particles for the first magnetic layer is selected from the group consisting of Fe, Co, Ni, Fe-Co alloy and Fe-Co-P alloy.

15. The magnetic recording medium according to claim 1, wherein the average particle diameter along the long axis of each grain in the first magnetic layer is in the range from 0.05 to 0.5 micrometers.

16. The magnetic recording medium according to claim 15, wherein the average particle diameter is 0.1 to 0.3 micrometers.

17. The magnetic recording medium according to claim 1, wherein the coercive force ratio is 1.2 to 1.4.

18. The magnetic recording medium according to claim 1, wherein a binder agent for the first and second magnetic layers is selected from the group consisting of a co-polymer of vinyl chloride-vinyl acetate, a polyester, a polyurethane, a cellulose resin, polyvinyl butyral, polyacetal and polyisocianate.

* * * * *